United States Patent [19]

Yamanaka et al.

[11] Patent Number: 4,867,476

[45] Date of Patent: Sep. 19, 1989

[54] SHOCK ABSORBER UNIT

[75] Inventors: Toshihiko Yamanaka, Nagoyashi; Kenji Hayashi, Toyotashi, both of Japan

[73] Assignee: Aisin Seiki Kabushiki Kaisha, Aichi, Japan

[21] Appl. No.: 215,143

[22] Filed: Jul. 5, 1988

[30] Foreign Application Priority Data

Jul. 3, 1987 [JP] Japan .................. 62-166534

[51] Int. Cl.$^4$ ............................. B60G 11/26
[52] U.S. Cl. .................... 280/714; 280/707; 280/6.12; 280/DIG. 1
[58] Field of Search ............ 280/707, 714, 6.12, 280/DIG. 1

[56] References Cited

U.S. PATENT DOCUMENTS 4,647,069 3/1987 Iijima .................. 280/707
4,693,493 9/1987 Ikemoto et al. .......... 280/707

*Primary Examiner*—Kenneth R. Rice
*Attorney, Agent, or Firm*—Sughrue, Mion, Zinn, Macpeak & Seas

[57] ABSTRACT

A valve system is disclosed which prevents a shrinkage or an elongation of a shock absorber in response to a compressive or tensile load applied thereto as a result of a rolling or pitching effect of a vehicle. The valve system comprises a switching valve movable among a second position in which a high pressure is introduced into an upper chamber of a shock absorber while a low pressure is introduced into a lower pressure which is separated from the upper chamber by a piston, a third position in which a low pressure is introduced into the upper chamber while a high pressure is introduced into the lower chamber, and a first position (holding position) in which the upper and the lower chamber are disconnected from a pressure source; a first and a second open/close valve which open or close a path between the switching valve on one hand and the upper and the lower chamber on the other hand; and a third open/close valve which opens or closes a path between the upper chamber and a gas spring bladder. A second mode in which the switching valve assumes its second position and the first open/close valve is enabled to pass a flow therethrough is selected in response to the compressive load. A third mode in which the switching valve assumes its third position and the second open/close valve is enabled to pass a flow therethrough while the third open/close valve is closed is selected in response to the tensile load. When neither compressive nor tensile load is applied, the first mode is selected in which the switching valve assumes its first position and the third open/close valve is enabled to pass a flow therethrough. The valve system assumes the first mode when all of the switching valve and the first, the second and the third open/close valve are deenergized.

8 Claims, 5 Drawing Sheets

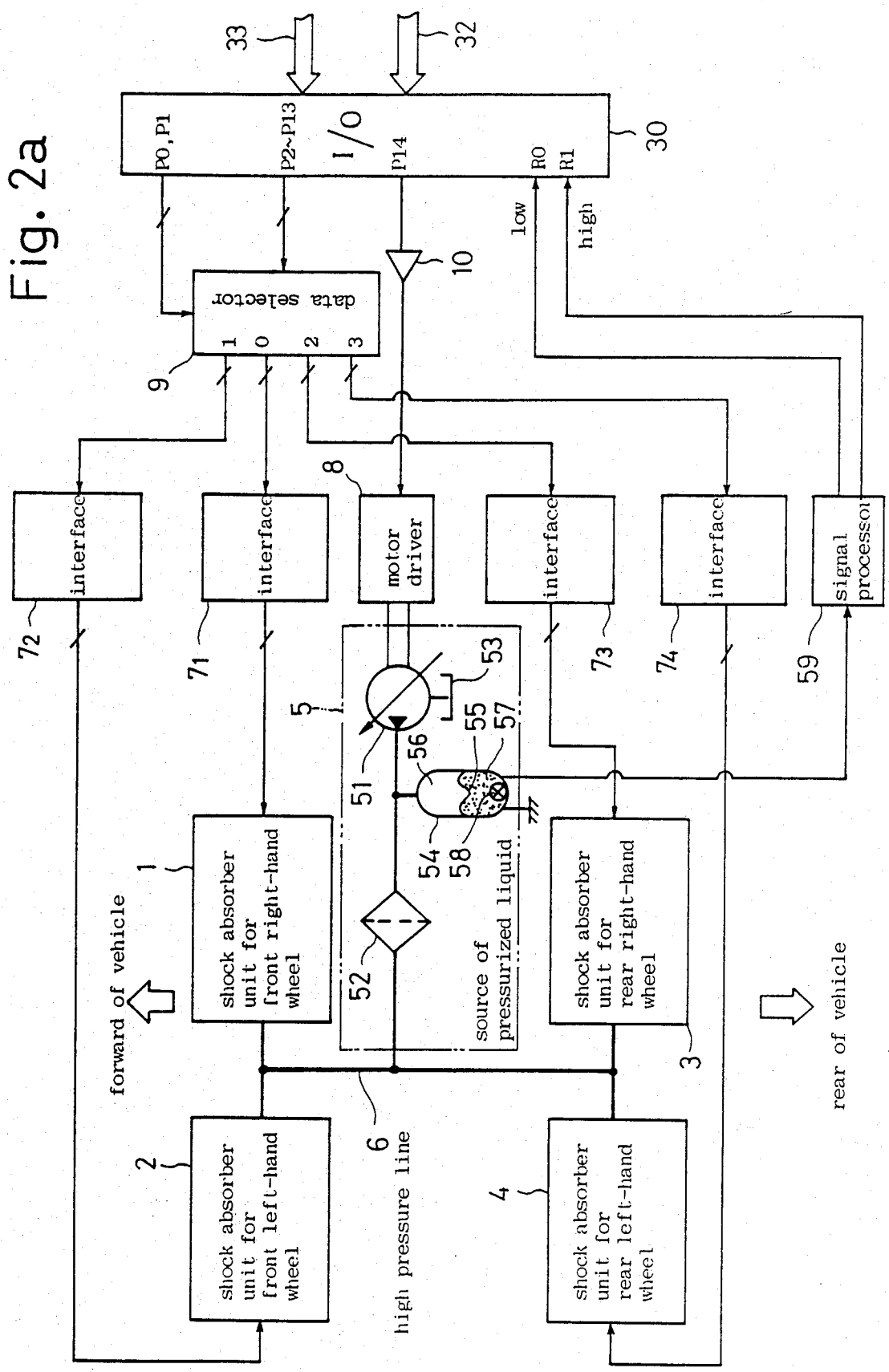

SHOCK ABSORBER UNIT

FIELD OF THE INVENTION

The invention relates to a suspension for supporting a carrosserie of a road vehicle, railroad vehicle or aeronautical vehicle with respect to wheels thereof, and in particular, to a shock absorber unit of such suspension which is effective to reduce or prevent the transmission of oscillations or shocks from the wheels to the carrosserie.

The prior art for such unit includes a hydropneumatic suspension unit (as disclosed in Japanese Laid-Open Patent Application No. 127,318/1974, for example) and a hydraulic suspension unit (as disclosed in Japanese Laid-Open Patent Application No. 55,913/1979). In order to maintain a proper attitude of a vehicle, such units include a valve unit which selectively supplies a high pressure liquid into a first and a second chamber within a servo cylinder of the suspension which is divided by a piston.

A suspension of the former type exhibits a gas spring response that the rate of change in the volume of gas within a gas spring bladder in response to an increase in the load applied to the suspension is high in a low load region, and is low in a high load region. This feature is recognized in Japanese Patent Publication No. 41,675/1979, for example. Accordingly, the spring rate will be drastically reduced for low loads, causing an increased vertical displacement of the carrosserie with respect to a given change in the load, thus presenting a problem that a pitching or rolling of the carrosserie may be promoted.

In a suspension of the latter type, switching valve means is utilized to supply a pressurized liquid or a drain pressure selectively into a first and a second chamber within a strut cylinder which is divided by a piston. The transmission of oscillations from the wheels to the carrosserie is suppressed by operating the switching valve means in a manner dependent on the relative spacing between the carrosseries and the wheels, the rate of change in such spacing and a pressure differential between the first and the second chamber among a first mode in which the first and the second chamber are disconnected from a source of pressurized liquid and the drain pressure, a second mode in which the pressurized liquid is supplied to the first chamber while the second chamber communicates with the drain pressure, and a third mode in which the first chamber communicates with the drain pressure while the pressurized liquid is supplied to the second chamber. In this manner, the mode of operation of the switching valve means is changed in accordance with the magnitude of oscillations in order to suppress the oscillations of the carrosserie. It will be seen therefore that a relatively high output capacity is required of the source of pressurized liquid in order to establish a high pressure within the respective chambers rapidly where the supply of high and low pressures to the first and the second chamber is switched frequently. In addition, the source of such pressurized liquid must be operated substantially continuously, so that a required high pressure can be delivered any time it is desired. This means that the source of pressurized liquid must have an increased capacity and requires an increased power dissipation for its operation. Since the switching valve means is frequently energized for the intended switching operation, it is also associated with an increased power dissipation.

As an additional consideration, when a vehicle is running along a curved path in response to a turning of a steering wheel, any resulting change in the attitude of the vehicle which may be caused by a rolling thereof must be prevented by effecting a shock absorber control which changes the damping force thereof during the rolling process, as disclosed in Japanese Laid-Open Patent Application Nos. 182,505/1982, 93,616/1983, 116,214/1983 and 167,210/1983, for example. However, such control remains to be a throttling control of a channel path between the first and the second chamber in the servo cylinder.

SUMMARY OF THE INVENTION

It is an object of the invention to provide a shock absorber unit which is suitable for maintaining a proper attitude of a vehicle by controlling the pressures in the first and the second chamber, rather than merely controlling the damping force. It is another object of the invention to provide a shock absorber unit which overcomes the problems of the prior art that the carrosserie is subject to an increased magnitude of vertical displacement in response to a given change in a low load region and that the source of pressurized liquid must be of a high capacity and exhibits an increased power dissipation and associated switching valve unit also exhibits an increased power dissipation.

In accordance with the invention, there is provided a shock absorber unit comprising a shock absorber including a strut cylinder, a piston which divides the internal space of the strut cylinder into a first and a second chamber, and a gas spring bladder unit; a source of pressurized liquid; switching valve means including a first port which receives a pressurized liquid from the source, a second port adapted to receive a drain pressure, and a third and a fourth port which selectively deliver a pressurized liquid and a drain pressure, and also including means movable between a first position where the communication between the first and the second port on one hand and the third and the fourth port on the other hand is interrupted, a second position where the communication between the first and the third port as well as the communication between the second and the fourth port are established and a third position where the communication between the first and the fourth port as well as the communication between the second and the third port are established, thereby establishing a selected communication between the first and the second port on one hand and the third and the fourth port o the other hand; first open/close valve means for opening or closing a flow path between the third port of the switching valve means and the first chamber; second open/close valve means for opening or closing a flow path between the fourth port of the switching valve means and the second chamber; and third open/close valve means for opening or closing a flow path between a liquid chamber of the gas spring bladder unit and the first chamber.

When the switching valve means assumes its first position and the third open/close valve means is open, the source of pressurized liquid and the drain are disconnected from the first and the second chamber of the strut cylinder while the first chamber communicates with the liquid chamber of the gas spring bladder unit. If the wheels are subject to oscillations or shocks, a load which occurs between the piston relative to the strut cylinder causes a flow of fluid disposed within the strut cylinder through the damping regulator means from the first to the second chamber or vice versa, whereby the oscillations or shocks which would otherwise be transmitted from the wheels to the carrosserie through the suspension will be attenuated in accordance with the liquid flow area of the damping regulator means. It will be seen that the damping effect will be reduced if the flow area is large, but will be increased if such flow area is reduced. Since the first chamber is in communication with the liquid chamber of the gas spring bladder unit, if the oscillations or shocks causes an increase in the pressure within the first chamber, the pressure in the liquid chamber of the gas spring bladder unit will increase, causing separation means which represents a diaphragm between the liquid chamber and the gas chamber of the bladder unit to move in a direction to reduce the volume of the gas chamber, thus compressing the gas therein. Conversely, when the pressure within the first chamber decreases, the pressure in the liquid chamber of the bladder unit also decreases, allowing the gas within the gas chamber of the bladder unit to expand, causing the separation means to move in a direction to reduce the volume of the liquid chamber. In this manner, the compression/expansion of the gas in the bladder unit provides an effective gas cushioning upon the carrosserie. The setting of the switching valve means and the open/close valve means which achieve such behavior of the suspension will be referred to as a first mode for convenience of description. The first mode is effective in suppressing the vertical oscillations of the wheels to a comfortable level as sensed on the carrosserie where the load is substantially uniformly applied to all the suspensions as when the vehicle is running straightforward. However, if the vehicle experiences a rolling effect, for example, which causes a selected suspension to be subject to a compression (which drives a piston in a direction to reduce the volume of the first chamber) while another suspension is subject to an elongation (which drives the piston in a direction to increase the volume of the first chamber), the bladder unit will act in a manner such that the piston rod will be overly extended into the associated strut cylinder for the suspension which experiences the compression while the piston rod will overly project from the strut cylinder for the suspension which is subject to the elongation, causing the carrosserie to assume a tilted attitude. Thus, the first mode is inappropriate in a situation where the carrosserie is subject to a rolling or pitching effect.

The switching valve means is then brought to its second position and the first open/close valve means is opened while the second open/close valve is either open or closed. This setting will be referred to as a second mode. At this time, the first chamber of the strut cylinder receives a pressurized liquid from the source while the second chamber is either closed or communicates with the drain pressure. Under this condition, the pressurized liquid drives the piston in a direction to increase the volume of the first chamber, and accordingly, if the suspension is subject to compression, the shrinkage of the suspension or the retracting movement of the piston rod will be prevented. Thus, the second mode is effective in preventing the carrosserie from assuming a tilted attitude when it is applied to a suspension which is subject to compression where the carrosserie experiences a rolling or pitching effect. In the second mode, the third open/close valve means is preferably left open as during the first mode. This enables a gas cushioning upon the carrosserie when the wheels are subject to oscillations or shocks, in the similar manner as in the first mode.

The switching valve means may also be brought to its third position with the second open/close valve means open, the first open/close valve means being either closed or open and the third open/close valve means closed. This setting will be referred to as a third mode. Under this condition, the second chamber of the strut cylinder receives the pressurized liquid from the source while the first chamber is either closed or communicates with the drain pressure. It will be seen that the pressurized liquid drives the piston in a direction to reduce the volume of the first chamber, and hence if the suspension is subject to an elongation, any resulting elongation of the suspension will be prevented. Accordingly, the third mode is effective in preventing the carrosserie from assuming a tilted attitude when it is applied to a suspension which is subject to an elongation when the carrosserie experiences a rolling or pitching effect. In the third mode, the third open/close valve means is closed, and hence the gas cushioning is without effect. However, it will be understood that where the suspension is subject to an elongation, any oscillation or shock applied to the wheels which is transmitted to the carrosserie will be of a reduced level. The third open/close valve which is maintained closed prevents an excessive expansion of the separation means of the bladder unit which may be caused by the first chamber assuming the drain pressure.

Accordingly, the shock absorber unit of the invention is capable of accommodating for any oscillation or shock by a suitable level of gas cushioning during the first mode and is also capable of reducing or preventing a tilted attitude of the carrosserie which may be caused by an imbalance in the loads applied to the suspensions which is in turn caused by a rolling effect when running around a curved road, a pitching effect due to a rapid acceleration or deceleration or an inclination of the surface such as the road surface which supports the wheels, during the second and the third mode. Thus, where a rolling or pitching effect occurs as a result of a driving condition of the vehicle or the inclination of the road surface, the shock absorber unit which is subject to the compression may be operated in its second mode while the shock absorber unit which is subject to the elongation may be operated in its third mode, thus effectively preventing the carrosserie from assuming a tilted attitude. Any excessive tilting of the carrosserie due to a rolling or pitching effect can be prevented. The first mode may be operated in the absence of a rolling or pitching effect, allowing a comfortable air conditioning effect to be enjoyed.

It will be understood that the source of pressurized liquid can be loaded during the second and the third mode, but cannot be loaded during the first mode. Hence, the consumption of the pressurized liquid is reduced, and such source may be driven only when the second or the third mode is required. Alternatively, an accumulator of a relatively small capacity and a pressure sensor may be provided, and the source may be driven only during the time the pressure reduces below a given value so that the accumulator maintains a selected pressure. In this manner, a power dissipation associated with the source of a pressurized liquid can be reduced. The switching valve means as well as the first to the third open/close valve means are energized only during the occurrence of a rolling or pitching effect, but may be deenergized otherwise, again substantially reducing the power dissipation associated with these valve means.

Other objects and features of the invention will become apparent from the following description of an embodiment thereof with reference to the drawings.

BRIEF DESCRIPTION OF THE DRAWINGS

FIG. 2a is a block diagram of part of a vehicle attitude control system of a vehicle on which the shock absorber unit 1 shown in FIG. 1a is mounted;

FIG. 3a is a schematic view illustrating a register which stores control data assigned to shock absorber units by a microprocessor shown in FIG. 2b; and FIG. 3b is a flow chart of an attitude control operation by the microprocessor.

DESCRIPTION OF PREFERRED EMBODIMENT

Figure 1A:
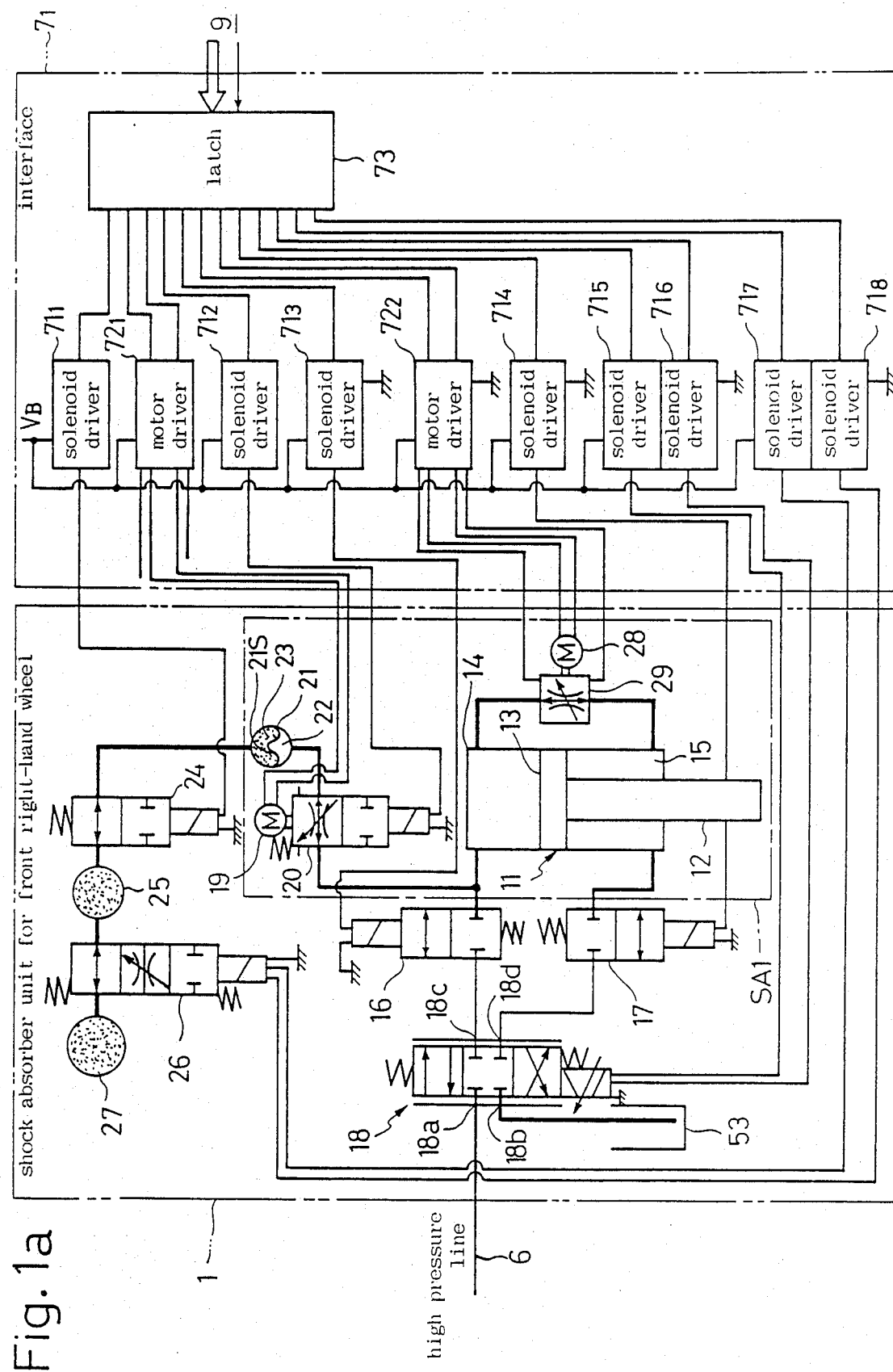
FIG. 1a is a block diagram of one embodiment of the invention where a shock absorber unit 1 is in its first mode.

Referring to FIG. 1a which illustrates one embodiment of the invention, a shock absorber SA1 includes a strut cylinder 11, the internal space of which is divided by a piston 13 into a first chamber 14 and a second chamber 15. One of a piston rod 12 secured to the piston 13 and the cylinder 11 is connected to a carrosserie while the other is connected to a road wheel. The first chamber 14 and the second chamber 15 communicate with each other through a variable orifice valve unit 29 which functions to regulate the damping force. The orifice valve unit 29 includes a rotor (not shown), which is driven by an electric motor 28 for determining an orifice opening. The orifice opening is determined in accordance with the angle of rotation of the rotor.

In the present embodiment, the valve unit 29 is located outside the strut cylinder 11, but it should be understood that the valve unit 29 may be assembled into the piston 13 in a well known manner, as illustrated in U.S. Pat. No. 4,702,123. In such instance, the first chamber 14 and the second chamber 15 are interconnected through an orifice, the opening of which is determined by a rotor (not shown) which is driven for rotation by the electric motor 28. The rotor has a rotary shaft which extends through the piston rod 12 and which is coupled to a reduction gearing located on the free end of the piston rod 12, the motor 28 also driving the reduction gearing.

Continuing the description of FIG. 1a, the first chamber 14 communicates with an output port of a first open/close valve unit 16 and an input port of a third open/close valve unit 20. The third open/close valve unit 20 has an output port which communicates with a liquid chamber 22 of a gas bladder 21, which may be integral with the strut cylinder 11. The third open/close valve unit 20 comprises a variable orifice valve unit which is driven by an electric motor 19, and an open/close valve which is driven by a solenoid which may be energized to close the valve. When the solenoid is deenergized, an orifice opening of the variable orifice valve unit is determined by the angle of rotation of a rotor (not shown) which is driven by the motor 19.

A combination of the strut cylinder 11, the variable orifice valve unit 29, the variable orifice valve unit of the third open/close valve unit 20 and the gas bladder 21 is known as one form of shock absorber in which the valve unit 29 is effective to regulate the damping effect while the variable orifice valve unit of the valve unit 20 and the gas spring bladder unit 21 jointly operate to regulate the gas spring response.

In the present embodiment, the gas spring bladder unit 21 includes a gas chamber which is connected through a fourth open/close valve unit 24 to a second bladder 25, which is in turn connected to a third bladder 27 through a fifth open/close valve unit 26. These added elements serve adjusting the amplitude and the resonant frequency of an air cushion defined by the bladder units (21, 25 and 27). The fourth open/close valve unit 24 includes a solenoid while the fifth open/close valve unit 26 is changeable between three modes, including, a fully open, an orifice flow path and a fully closed mode. At this end, the valve unit 26 includes two sets of solenoids. Its orifice is adjusted through a mechanical link.

The first open/close valve unit 16 connected to the first chamber 14 and the second open/close valve unit 17 connected to the second chamber 15 of the strut cylinder 11 each includes a single solenoid which may be energized to drive its plunger to its opened position (flow enable). The first and the second open/close valve unit 16, 17 have input ports which communicate with a third port 18c and a fourth port 18d, respectively, of a switching valve unit 18.

In addition to the third and the fourth port 18c, 18d, the switching valve unit 18 includes a first port 18a communicating with a high pressure line 6 which receives a pressurized liquid from a source of pressurized liquid, a second port 18b communicating with a drain pressure line, and additionally includes a plunger and solenoid which are effective to establish an interconnection between these ports selectively by allowing the plunger to be movable among a first position in which a communication between the first and the second port 18a and 18b on one hand and the third and the fourth port 18c and 18d on the other hand is interrupted, a second position in which a communication between the first port 18a and the third port 18c as well as a communication between the second port 18b and the fourth port 18d are established, and a third position in which a communication between the first port 18a and the fourth port 18d as well as a communication between the second port 18b and the third port 18c are established.

Figure 1B:
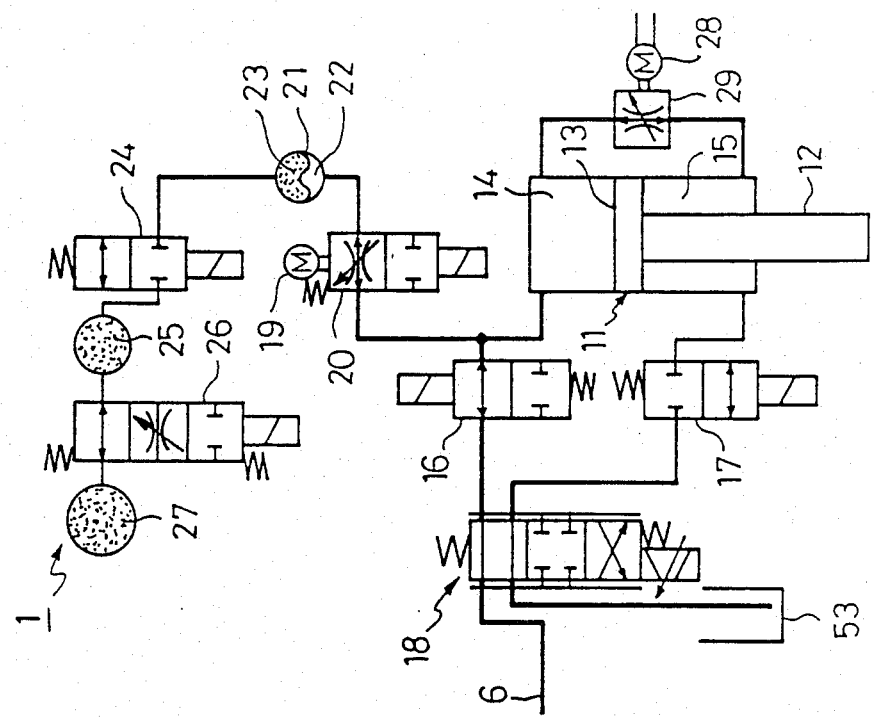
FIG. 1b is a similar view to FIG. 1a, illustrating the shock absorber unit in its second mode.
Figure 1C:
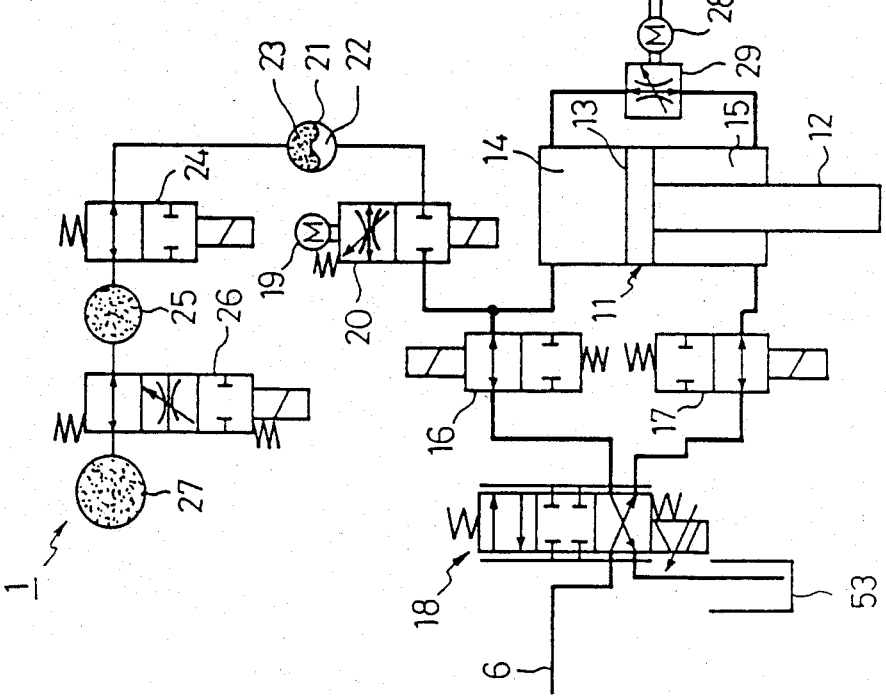
FIG. 1c is a similar view to FIG. 1a, illustrating the shock absorber unit in its third mode.

FIG. 1a illustrates the shock absorber SA1 and a mode selecting valve circuit comprising the switching valve unit 18 and the first and the second switching valve unit 16, 17 in the first mode mentioned above. By contrast, FIG. 1b shows these elements in the second mode, and FIG. 1c shows these elements in the third mode. In the first mode illustrated in FIG. 1a, the air cushion defined by the bladder units 21 to 27 acts properly upon the shock absorber SA1. Since the piston 13 is allowed to move easily in the vertical direction, the piston tends to be easily displaced in response to a compressive or tensile load applied to the absorber SA1. As mentioned previously, the first mode is selected when a vehicle is running straightforward and the road surface is substantially horizontal.

In the second mode illustrated in FIG. 1b, the pressurized liquid present within the first chamber 14 is effective to resist the movement of the piston rod 12 into the strut cylinder 11, thus presenting a resistance to the movement of the piston in the vertically upward direction while allowing its movement in the vertically downward direction. The second mode is selected to prevent an excessive retracting movement of the piston rod 12 when a compressive load is applied to the shock absorber as a result of a rolling or pitching effect which the vehicle experiences.

In the third mode illustrated in FIG. 1c, the pressurized liquid present within the second chamber 25 is effective to resist a movement of the piston rod 12 in a direction away from the strut cylinder 11, thus presenting a resistance to a movement of the piston in the vertically downward direction while allowing its movement in the vertically upward direction. The third mode is selected to prevent an excessive projecting movement of the piston rod 12 when a tensile load is applied to the shock absorber as a result of a rolling or pitching effect which the vehicle experiences.

Figure 2B:
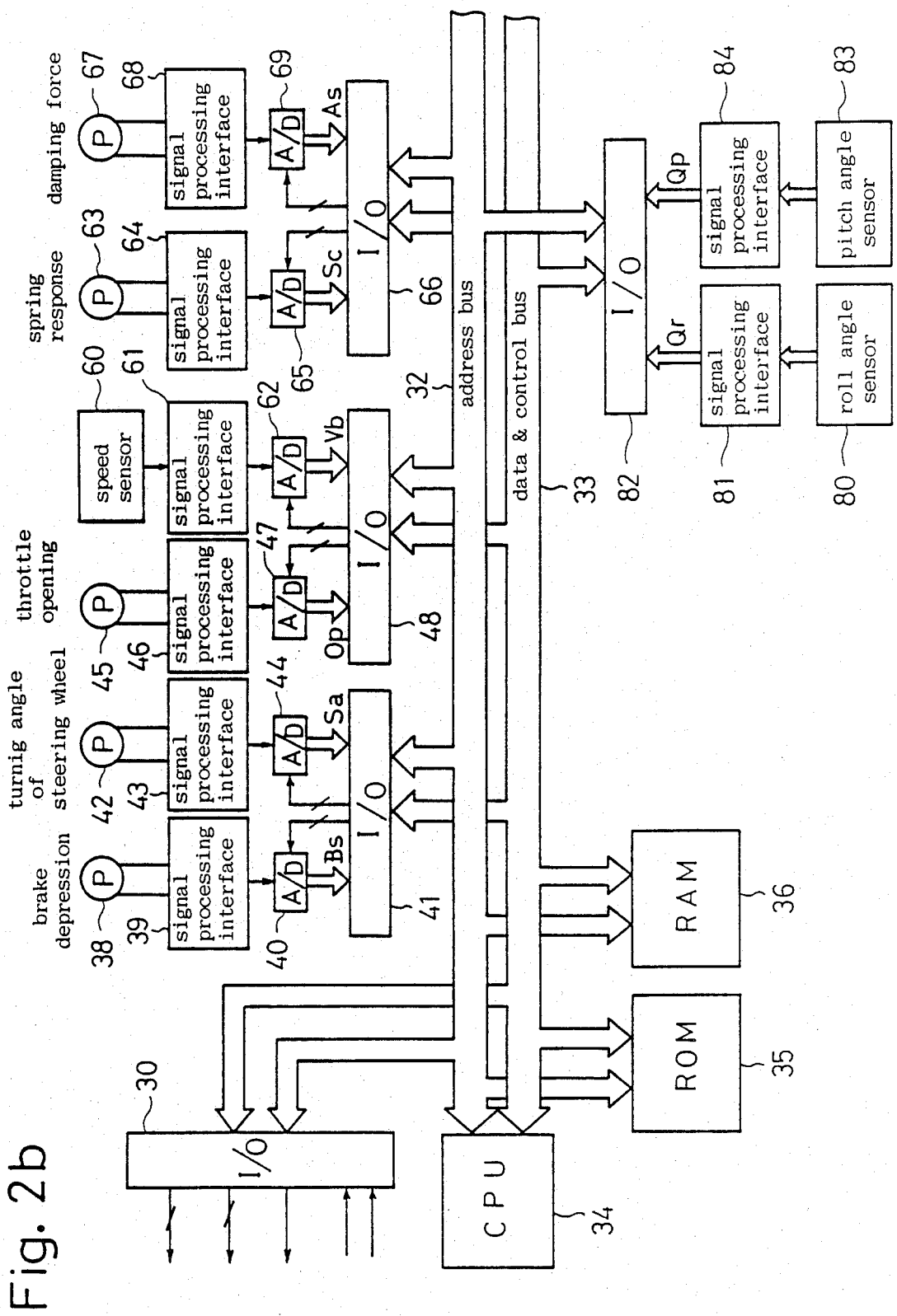
FIG. 2b is a block diagram of another part of the system.

FIGS. 2a and 2b in combination illustrates a vehicle attitude control system for a shock absorber unit 1 shown in FIG. 1a. It is to be understood that the shock absorber 1 shown in FIG. 1a is used in a suspension for a front wheel of a vehicle. Shock absorber units 2 to 4 which are used in the suspensions of the remaining wheels are constructed in the similar manner as the unit 1.

A source of pressurized liquid 5 is connected to the high pressure line 5. The source 5 comprises a variable capacity pump 51, an accumulator 54 and a filter 52, with pressurized liquid from the accumulator 54 being fed through the filter 52 to feed the high pressure line 6. When the variable capacity pump 51 is energized, it draws liquid from a drain 53 and discharges it through the filter 52 into the accumulator 54. An internal pressure of the accumulator 54 is detected by a pressure sensor 58.

Various solenoids and motors associated with various valve units of the shock absorber units 1 to 4 are connected to interfaces 7₁ to 7₄, the motor associated with the pump 51 is connected to a motor driver 8, and the pressure sensor 58 is connected to a signal processor 59. As an example, the arrangement of the interface 7₁ is illustrated in FIG. 1a, and it is to be understood that the remaining interfaces 7₂ to 7₄ are constructed in the similar manner as the interface 7₁.

Each of the interfaces 7₁ to 7₄ has an input latch, denoted by numeral 73 in FIG. 1a, which is fed with a signal for controlling a shock absorber from a data selector 9, the signal commanding on/off (energization/deenergization) of the plurality of solenoids and the energization of the plurality of motors in forward-/reverse direction. The data selector 9 is supplied with such control signal from an input/output port 30.

FIG. 2b illustrates a control system which establishes the first, the second or the third mode for each of the shock absorber units 1 to 4. Specifically, the input/output port 30 is connected to an address bus 32 and a data & control bus 33, which are in turn connected with a microprocessor (hereafter referred to as "CPU") 34, ROM 35 which stores control programs and constants data, and RAM 36 which provides a temporary storage of input and output data and input and output ports 30, 41, 48, 66 and 82.

The amount of depression of a brake pedal of a vehicle is detected by a potentiometer 38; the angle through which a steering wheel is turned is transmitted through a reduction gearing (not shown) to be detected by a potentiometer 42; and the opening of a throttle valve of an onboard engine is detected by a potentiometer 45. A speed sensor 60 develops an electrical signal of a frequency which is proportional to the speed of rotation of an output shaft of a onboard transmission. The frequency of this electrical signal is converted into a corresponding voltage by a signal processor 61. A potentiometer 63 which is utilized to specify a particular gas spring response develops an electrical signal indicating the position of an adjusting knob for the gas spring response which is operated by a driver of the vehicle. A potentiometer 67 which is utilized to specify a damping effect develops an electrical signal representing the position of an adjusting knob for the damping effect which is operated by the driver of the vehicle. The analog electrical signals developed by these potentiometers are amplified and waveform shaped by signal processors 39, 43, 44, 64, 68 and then delivered to A/D converters 40, 44, 47, 62, 65 and 69. CPU 34 commands the A/D conversion by these converters through the input and output ports 41, 48 and 66 at given timings, thus reading digital data produced by these converters.

A roll angle of the carrosserie is detected by a sensor 80 while its pitch angle is detected by a sensor 83. These sensors provides coded signals representing the values detected, which signals are amplified or waveform shaped by signal processors 81, 84. CPU 34 reads these codes through the input/output port 82.

In response to the brake pedal depression Bs detected by the potentiometer 38, the turning angle of the steering wheel Sa detected by the potentiometer 42, the throttle opening Op detected by the potentiometer 45, the vehicle speed Vb detected by the combination of the speed sensor 60 and the signal processor 61, the roll angle Qr detected by the sensor 80 and the pitch angle Qp detected by the sensor 83, CPU 34 determines the balanced or unbalanced condition of loads which are applied to the shock absorber units 1 to 4. When it determines that the loads are unbalanced, it then determines those shock absorbers which experience a compressive load and those shock absorbers which experience a tensile load. It then sets the shock absorber or absorbers which experience a balanced load in its first mode (FIG. 1a) while it sets the shock absorber or absorbers which experience a compressive load in its second mode (FIG. 1b) and it sets the shock absorber or absorbers which experience a tensile load in its third mode (FIG. 1c). In addition, CPU 34 sets an open-/closed position of the third open/close valve unit 20, the orifice opening of the variable orifice valve unit of the unit 20, an open/closed position of the fourth open-/close valve unit 24 and a fully open/orifice flow/fully closed position of the fifth open/close valve unit 26 to thereby determine the gas spring response in accordance with a voltage developed by the potentiometer 63, and also sets up the orifice opening of the variable orifice valve unit 29 or the damping force in accordance with a voltage developed by the potentiometer 67.

FIG. 3a illustrates the arrangement of data which is written into an output register 1 assigned to the shock absorber unit 1 (this being a register for storing output data and which is assigned to an internal RAM of CPU 34 or RAM 36). In the example shown, the shock absorber unit 1 is assigned with twelve bits A to L from its most significant digit 11 to the least significant digit 0. Four bits A to D represent a mode selecting signal and the following two bits E and F represent a damping presetting signal while the remaining six bits G to L represent a signal which establishes a particular gas spring response. In FIG. 3a, the assignment of these bits to various valve units and motors of the shock absorber unit 1 is indicated by arrows.

Specifically, bits A and B are assigned to the switching valve unit 18. When A=0 (representing a low level) and B=0, a command is given to the switching valve unit 18, which is then established in its first position (FIG. 1a) where the two solenoids are turned off. When A=1 (representing a high level) and B=0, a command is given to the switching valve unit 18 to establish its second position (FIG. 1b) where the first solenoid is turned on while the second solenoid is turned off. When A=0 and B=1, a command is given to the switching valve unit 18 to establish its third position (FIG. 1c) where the first solenoid is turned off while the second solenoid is turned on. The bit C is assigned to the first open/close valve unit 16, C=0 representing a close command having its solenoid turned off and C=1 representing an open command having its solenoid turned on to enable a flow therethrough.

Bit D is assigned to the second open/close valve unit 17, with D=0 representing a close command having its solenoid turned off and D=1 representing an open command having its solenoid turned on to enable a flow therethrough.

Bits E and F are assigned to the motor 28 of the variable orifice valve unit 29, and represents a binary code which indicates the target opening of the rotor which determines the orifice opening. The valve unit 29 is provided with a limit switch which detects both the maximum and the minimum opening. A motor driver $72_2$ ceases the energization of the motor for rotation in the forward direction when the maximum opening detecting switch is turned on during the rotation thereof in the forward direction, and also ceases the energization of the motor for rotation in the reverse direction when the minimum opening detecting switch is turned on during its rotation in the reverse direction. An opening between the maximum and the minimum value is determined by the length of time during which the motor 28 is energized by the motor driver $72_2$ from its maximum or minimum opening, and when such opening reaches a target opening (EF) supplied from CPU 34, the motor ceases to operate.

Bit G is assigned to the open/close drive solenoid associated with the third open/close valve unit 20, with G=0 representing an open command which enables a flow through its orifice and G=1 representing a close command which interrupts such flow.

Bits H and I are assigned to the motor 19 associated with the unit 20, and is a binary code indicating a target position of the rotor which determines the orifice opening of the variable orifice valve unit of the unit 20. The valve unit 20 is also provided with limit switches which detects the maximum and the minimum opening. A motor driver $72_1$ ceases the energization of the motor for rotation in the forward direction when the maximum opening detecting switch is turned on during its rotation in the forward direction, and also ceases the energization of the motor in the reverse direction when the minimum opening detecting switch is turned on during its rotation in the reverse direction. An opening between the maximum and the minimum value is determined by the length of time during which the motor 19 is energized by the motor driver $72_1$ from its maximum or minimum opening, and when such opening reaches a target opening (HI) supplied from CPU 34, the motor ceases to operate.

Bit J is assigned to the fourth open/close valve unit 24, with J=0 representing an open command having its solenoid turned off to enable a flow therethrough and J=1 representing a close command having its solenoid turned on to interrupt such flow.

Bits K and L are assigned to the fifth open/close valve unit 26. When K=0 and L=0, the both solenoids are turned off to enable a flow through the orifice. When K=1 and L=0, the valve unit assumes a fully open position by having the first solenoid turned on and the second solenoid turned off. Finally, when K=0 and L=1, the valve unit assumes its fully closed position by having its first solenoid turned off and the second solenoid turned on.

It should be understood that the shock absorber units 2 to 4 are also associated with respective output registers 2 to 4, respectively, which are constructed in the similar manner as described above in connection with the output register 1. However, it is to be noted that mode selecting data bits A to D in the output registers 1 to 4 may be different from each other depending on the attitude of the vehicle and a running condition.

FIG. 3b illustrates a control operation performed by CPU 34. When power supply is turned on at step 1 (in the description to follow, the step number with or without alphabetical character representing a particular step will be indicated in parentheses), CPU 34 is initialized (2a). During the initialization, internal counters, flags and registers of CPU 34 as well as various registers assigned to RAM 36 are all cleared, and data which selects a standard mode (the first mode representing a condition illustrated in FIG. 1a) is written into output registers 1 to 4, with such content being delivered to interfaces $7_1$ to $7_4$, respectively. In this manner, the first mode is established in each of the shock absorber units 1 to 4, generally as shown in FIG. 1a.

After the initialization (2a), CPU 34 starts a program timer dT (2b). The time limit dT of this timer represents a period with which a vehicle attitude control operation including steps 2b to 13 shown in FIG. 3b is repeatedly executed.

When the timer dT starts, CPU 34 reads the pressure detected by the pressure sensor 58 (whether it is above or below a proper range), the depression Bs of the brake pedal, the angle of rotation Sa of the steering wheel, the throttle opening Op, vehicle speed Vb, gas spring response specifying code Sc, damping code As, roll angle Qr and the pitch angle Qp of the carrosserie, all shown in FIG. 2b (3).

The pressure detected by the sensor 18 is then examined. When it indicates a low pressure, CPU 34 delivers a signal (a high level 1), commanding the variable capacity pump 51 to be driven, to output port P14 of the input/output port 30. Conversely, when the sensor 58 has detected a high pressure, CPU 34 delivers a signal (of a low level 0), which specifies that the variable capacity pump 51 be deenergized, to the port P14. When the pressure detected by the sensor 58 indicates neither high nor low level, the signal which is then present at the output port P14 is maintained (4).

The damping code As is then written into the output registers 1 to 4, or more specifically, to bits E and F thereof (5).

Subsequently, CPU 34 looks up a conversion table in ROM 35 to decode the gas spring response code Sc into data which specifies the spring resilience (G to L), which is then written into the output registers 1 to 4 or to bits G to L thereof (6).

CPU 34 then calculates the acceleration/deceleration dBs of depression of the brake pedal, the acceleration/deceleration dSa of the turning of the steering wheel, the acceleration/deceleration dOp of the throttle opening and the acceleration/deceleration dVb of the vehicle which are to be used in preparing data used to select a particular mode or modes for each of the shock absorber units 1 to 4. At this end, at step 3, the values of the depression Bs of the brake pedal, the turning angle Sa of the steering wheel, the throttle opening Op and the vehicle speed Vb which have been read previously or a time interval dT before are subtracted from the corresponding values which are currently read. At steps 8 to 11, data which selects a particular mode for each of the shock absorber units 1 to 4 is prepared and then written into registers 1 to 4.

It will be understood that there are many parameters which influence upon the attitude (roll or pitch) of a vehicle. In the present embodiment, Bs, dBs, Sa, dSa, Op, dOp, Vb, dVb, Qr and dQp are used as such parameters. Since there are a number of combinations of these parameters, the control is categorized into an attitude control (11) which corresponds to the actual attitude of a vehicle utilizing Qr and Op, and a predictive attitude control which utilizes Bs, dBs, Sa, dSa, Op, dOp, Vb and dVb. In addition, the latter control is subdivided into a attitude control (10) which responds to Sa, dSa and Vb, an attitude control (9) which responds to Bs, dBs, Vb and dVb, and an attitude control (8) which responds to Op, dOp, Vb and dVb. The operation proceeds in the sequence of executing the attitude controls (8)–(9)–(10)–(11).

The primary object of the attitude control (8) is to suppress a nose-up or nose-down which may be caused by a relatively rapid depression or release of an accelerator pedal. When the opening Op is equal to or greater than a given value and when the parameter dOp or dVb has a positive value which exceeds a given value, it is predicted that a nose-up will occur. Accordingly, data which selects the third mode (FIG. 1c) is written into the output registers 1 and 2 while data which selects the second mode (FIG. 1b) is written into the output registers 3 and 4. During the attitude control (8), a flag $8_{23}$ is written into a flag register indicating that mode 2 or 3 has been selected. Alternatively, when the parameter Vb is equal to or greater than a given value and the parameter dOp reduces below a given value (negative value), it is predicted that a nose-down will occur, accordingly, data which selects the second mode (FIG. 1b) is written into the output registers 1 and 2 while data which selects the third mode (FIG. 1c) is written into the output registers 3 and 4. A flag $8_{23}$ is written into the flag register. If neither nose-up nor nose-down is predicted, and if none of flags $9_{23}$, $10_{23}$ and $11_{23}$ is set, data which selects the first mode (FIG. 1a) is written into the output registers 1 to 4 while clearing the flag $8_{23}$. If any one of these flags is set, the data in the output registers 1 to 4 is not updated while clearing only the flag $8_{23}$.

The primary function of the attitude control (9) is to suppress a nose-down or nose-up which may be caused by a relatively rapid depression or release of the brake pedal, and is executed when the flag $8_{23}$ is not set. When the flag $8_{23}$ is not set, it is predicted that a nose-down will occur if the absolute value of $dBs \times Vb$ or $Bs \times dVb$ is equal to or greater than a given value when the parameter Bs lies in a range in which the brake is effective. Accordingly, data which selects the second mode (FIG. 1b) is written into the output registers 1 and 2 while data which selects the third mode (FIG. 1c) is written into the output registers 3 and 4. A flag $9_{23}$ is written into a flag register, indicating that the mode 2 or 3 has been selected during the attitude control (9). It is predicted that a nose-up will occur if the absolute value of $dBs \times Vb$ goes outside a preset range when the value of the parameter Bs which prevails a time interval dT bebore lies in a range where the brake is effective. Accordingly, data which selects the third mode (FIG. 1c) is written into the output registers 1 and 2 while data which selects the second mode (FIG. 1b) is written into the output registers 3 and 4. A flag $9_{23}$ is written into a flag register, indicating that the mode 2 or 3 has been selected during the attitude control (9). If neither nose-down nor nose-up is predicted to occur, and if flags $8_{23}$, $10_{23}$ and $11_{23}$ are not set, data which selects the first mode (FIG. 1a) is written into the output registers 1 to 4 while clearing the flag $9_{23}$. If one of these flags is set, the data in the output registers 1 to 4 is not updated, only clearing the flag $9_{23}$.

The primary object of the attitude control (10) is to suppress a rolling of the carrosserie which may be caused as the vehicle turns, depending on the turning angle of the steering wheel and the vehicle speed, and is executed when flags $8_{23}$ and $9_{23}$ are not set. When flags $8_{23}$ and $9_{23}$ are not set, it is predicted that a rolling will occur depending on the direction in which the steering wheel is turned (Sa assuming a positive value for a right turn an assuming a negative value for a left turn) whenever the product Sa (absolute value; the neutral point being 0) $\times$ Vb is equal to or greater than a given value or the product dSa (namely, the absolute value of Sa which is currently read, from which the absolute value of Sa which is read a time interval dT before is substracted) $\times$ Vb is equal to or greater than a given value. For a right turn, data which selects the third mode (FIG. 1c) is written into the output registers 1 and 3 while data which selects the second mode (FIG. 1b) is written into the output registers 2 and 4. Similarly, for a left turn, data which selects the second mode (FIG. 1b) is written into the output registers 1 and 3 while data which selects the third mode (FIG. 1c) is written into the output registers 2 and 4. Flag $10_{23}$ is written into the flag register. When the parameter Vb is equal to or greater than a given value and dSa (a negative value) is less than a given value, it is predicted that a counter-rolling will occur. For a right turn (the current value of the parameter Sa being positive, meaning that the steering wheel is rapidly returned during the right turn), data which selects the second mode (FIG. 1b) is written into the output registers 1 and 3 while data which selects the third mode (FIG. 1c) is written into the output registers 2 and 4. For a left turn (the current value of the parameter Sa being a negative value, meaning that the steering wheel is rapidly returned during the left turn), data which selects the third mode (FIG. 1c) is written into the output registers 1 and 3 while data which selects the second mode (FIG. 1b) is written into the output registers 2 and 4. Flag $10_{23}$ is written into the flag register. In the absence of such conditions, and when none of flags $8_{23}$, $9_{23}$ and $11_{23}$ are set, data which selects the first mode (FIG. 1a) is written into the output registers 1 to 4, clearing the flag $10_{23}$. If any one of these flags is set, the output registers 1 to 4 are not updated, only clearing the flag $10_{23}$.

The primary object of the attitude control (11) is to enable a feedback attitude control which responds to the actual roll angle Qr and pitch angle Qp of the carrosserie, and is executed when none of the flags $8_{23}$, $9_{23}$ and $10_{23}$ is set. Thus, when these flags are not set, it is initially examined whether only one or both of Qr and Qp are equal to or greater than a given value. If only one of Qr and Qp is equal to or greater than a given value, data which selects the second mode (FIG. 1b) is written into output registers (1 and 3) associated with the absorber units (for example, 1 and 3) which experience a high load while data which selects the third mode (FIG. 1c) is written into the output registers (2 and 4) associated with absorber units (2 and 4) which experience a reduced load. If both Qr and Qp are equal to or greater than a given value, data which selects the second mode (FIG. 1b) is written into an output register associated with the absorber units (for example, 1) which experiences the maximum load, data which selects the third mode (FIG. 1c) is written into the output register 4 associated with the absorber unit (4) which experiences the minimum load, and data which selects the second mode (FIG. 1b) is written into the output registers (2 and 3) associated with absorber units (2 and 3) which experience intermediate loads. Flag $11_{23}$ is written into the flag register. When both Qr and Qp are less than a given value, flags $8_{23}$, $9_{23}$ and $10_{23}$ are examined, and if they are not set, data which selects the first mode (FIG. 1a) is written into the output registers 1 to 4, clearing the flag $11_{23}$. If any one of these flags is set, the output registers 1 to 4 are not updated, only clearing the flag $11_{23}$.

When the attitude controls (8), (9), (10) and (11) described above are executed in the sequence named, CPU 34 delivers data in the output register 1 to the interface $7_1$, data in the output register 2 to the interface $7_2$, data in the output register 3 to the interface $7_3$ and data in the output register 4 to the interface $7_4$, thus latching such data in the latches (73) contained in these interfaces $7_1$ to $7_4$ (12).

In this manner, the selected damping force (5) and the selected spring response (6) as well as data which selects the damping force, data which selects the spring response and data which selects the mode, all of which are activated during the attitude controls (8) to (11), are applied to the drivers which energizes or deenergizes the various valve units and motors associated with the absorber units 1 to 4, thus updating the gas spring response, the damping force and the mode or modes of the shock absorber units 1 to 4.

When CPU 34 delivers data from the registers 1 to 4, it then examines whether the timer dT has timed out (13), and waits for the time-out if the timer has not timed out (13). Upon time-out, the program returns to the step 2b where the timer dT is started again, again executing the control operation for the attitude control starting with a reading of inputs (3).

In the described embodiment, the first to the third mode are selected to operate the shock absorber units 1 to 4. However, the construction of each mode may be slightly modified or an increased number of modes may be employed. By way of example, the second mode (FIG. 1b) may be modified to open the second open/close valve unit 17 also. Similarly, the third mode (FIG. 1c) may be modified to close the first open/close valve unit 16. Alternatively, the second mode mentioned above may be designated as a 2-1 mode, and the mode shown in FIG. 1b, but in which the second open/close valve unit 17 is also open may be designated as a mode 2-2, the third mode mentioned above may be designated as a mode 3-2, and the mode illustrated in FIG. 1c, but in which the first open/close valve unit 16 is closed may be designated as a mode 3-1, thus utilizing a total of five modes. Where an increased number of modes are used in this manner, it is possible to select a mode 2-1 for a shock absorber which experiences a compressive load when the magnitude of the load is low, and to select a mode 2-2 for a higher load. Similarly, a mode 3-1 may be selected for a shock absorber which experiences a tensile load when the load is low, and a mode 3-2 may be selected for this shock absorber for a higher tensile load.

As described, the shock absorber unit of the present invention is effective to absorb oscillations or shocks with a proper level of gas cushioning when the first mode is selected, and is also capable of reducing or preventing a tilting of the carrosserie caused by unbalanced loads upon the suspensions which may be due to a rolling when the vehicle is running around a strongly curved road, a pitching which results from a rapid acceleration or deceleration or the inclination of a surface such as the road surface on which the wheels bear. Accordingly, in the event a rolling or pitching results from the driving condition of a vehicle or as a result of an inclined road surface, any resulting tilting of the carrosseries can be prevented by selecting the second (or 2-1 or 2-2) mode for the shock absorber unit which experiences a compressive load and selecting the third (or 3-1 or 3-2) mode for the shock absorber unit which experiences a tensile load. An excessive tilting of a carrosserie which results from a rolling or pitching effect can be prevented. The first mode may be selected when there is no rolling or pitching effect, thus affording a comfortable air cushioning effect.

The source of pressurized liquid 5 is loaded when the second (or 2-1, 2-2) mode and the third (or 3-1, 3-2) mode is selected, but is not loaded when the first mode is selected. Thus, the consumption of pressurized liquid is minimized. The source 5 may be driven whenever the selection of the second (or 2-1, 2-2) or the third (or 3-1, 3-2) mode is required. Alternatively, a combination of an accumulator of a relatively small capacity and a pressure sensor may be provided, and the source of pressurized liquid may be driven only during a time interval when the pressure of the accumulator is reduced, thus maintaining such pressure at a given value. In this manner, the power dissipation associated with driving the source 5 is reduced. It will also be seen that the power dissipation associated with the switching valve means 18 and the first to the third open/close valve means 16, 17 and 20 can be substantially reduced since they need be energized to enable a switching operation when a rolling or pitching effect occurs, but may be left deenergized otherwise.

What we claim is:

1. A shock absorber unit comprising
    a shock absorber including a strut cylinder, a piston which divides the internal space of the strut cylinder into a first and a second chamber, and a gas spring bladder unit;
    a source of pressurized liquid;
    switching valve means including a first port which receives a pressurized liquid from the source, a second port receiving a drain pressure, and a third and a fourth port which selectively deliver the pressurized liquid and the drain pressure, and also including means movable among a first position in which a communication between the first and the second port on one hand and the third and the fourth port on the other hand is interrupted, a second position in which a communication between the first and the third port as well as a communication between the second and the fourth port are established and a third position in which a communication between the first and the fourth port as well as communication between the second and the third port are established, thus, selectively establishing an interconnection among the first to the fourth port;

first open/close valve means for opening or closing a flow path between the third port of the switching valve means and the first chamber;

second open/close valve means for opening or closing a flow path between the fourth port of the switching valve means and the second chamber;

and third open/close valve means for opening or closing a flow path between the liquid chamber of the gas spring bladder unit and the first chamber.

2. A shock absorber unit according to claim 1 in which the gas spring bladder unit includes a first bladder including separation means separating between a liquid chamber and a gas chamber and movable in a direction to bring the pressures of the both chambers equal to each other in response to a pressure differential between the both chambers, the liquid chamber of the first bladder communicating with the third open/close valve means, a second and a third hollow bladder, fourth open/close valve means for opening or closing a flow path between the gas chamber of the first bladder and an internal space of the second bladder, and fifth open/close valve means for opening or closing a flow path between the internal space of the second bladder and an internal space of the third bladder.

3. A shock absorber unit according to claim 1 in which the switching valve means comprises a normally closed switching valve unit which normally assumes the first position in which the flow path between the first and the second port on the one hand and the third and the fourth port on the other hand is interrupted; wherein the first and the second open/close valve means each comprises a normally closed open/close valve unit; and e the third open/close valve means comprises a normally open open/close valve unit.

4. A shock absorber unit comprising
a shock absorber including a strut cylinder, a piston which divides the internal space of the strut cylinder into a first and a second chamber, and a gas spring bladder unit;
a source of pressurized liquid;
switching valve means including a first port which receives a pressurized liquid from the source, a second port receiving a drain pressure, and a third and a fourth port which selectively deliver the pressurized liquid and the drain pressure, and also including means movable among a first position in which a communication between the first and the second port on one hand and the third and the fourth port on the other hand is interrupted, a second position in which a communication between the first and the third port as well as a communication between the second and the fourth port are established and a third position in which a communication between the first and the fourth port as well as communication between the second and the third port are established, thus selectively establishing an interconnection among the first to the fourth port;

first open/close valve means for opening or closing a flow path between the third port of the switching valve means and the first chamber;

second open/close valve means for opening or closing a flow path between the fourth port of the switching valve means and the second chamber;

third open/close valve means for opening or closing a flow path between the liquid chamber of the gas spring bladder unit and the first chamber;

mode selection signal generating means responsive to the deceleration and the acceleration of a vehicle and a change in the direction in which the vehicle runs for determining if a compressive or tensile load is applied to the shock absorber and for generating a second mode selection signal in response to the compressive load, a third mode selection signal in response to the tensile load and a first mode selection signal when no substantial load is applied;

and drive means responsive to the first mode selection signal for driving the switching valve means to its first position and driving the third open/close valve means to its open position; responsive to the second mode selection signal for driving the switching valve means to its second position and for driving the first open/close valve means to its open position; and responsive to the third mode selection signal for driving the switching valve means to its third position, driving the second open/close valve means to its open position and driving the third open/close valve means to its closed position.

5. A shock absorber unit according to claim 4 in which the switching valve means comprises a normally closed switching valve unit which normally assumes the first position in which the flow path between the first and the second port on one hand and the third and the fourth port on the other hand is interrupted; wherein the first and the second open/close valve means each comprises a normally closed open/close valve unit; and wherein the third open/close valve means comprises a normally open open/close valve unit.

6. A shock absorber unit according to claim 5 in which the source of pressurized liquid comprises a pump for drawing a liquid from a drain and discharging a pressurized liquid to the first port of the switching valve means, an accumulator connected in a fluid path between the first port and the discharge port of the pump, a pressure sensor for detecting the internal pressure of the accumulator, and a pump driver, the mode selection signal generating means being effective, when the pressure sensor detects a low pressure, to drive the pump until the sensor detects a high pressure.

7. A method for controlling a shock absorber unit of the type having a strut cylinder, a piston which divides the internal space of the strut cylinder into a first and second chamber and a gas bladder unit, the method comprising:
connecting a source of pressurized liquid to a switching valve means;
detecting acceleration and deceleration of a vehicle and a change in the direction in which the vehicle is moving for determining if a compressive or tensile load is applied to the shock absorber and providing signals indicative thereof to a control unit;

generating a first mode selection signal when no substantial load is applied to the shock absorber, generating a second mode selection signal in response to a compressive load and generating a third mode selection signal in response to a tensile load; and controlling said switching valve means and additional valve means intermediate said switching valve means and said first and second chambers and said gas bladder unit in response to the specific mode selection signal.

8. A method as set forth in claim 7 further comprising pumping liquid from a drain by means of a pump having an accumulator therein to supply pressurized fluid to said switching valve means, detecting the internal pressure of said accumulator and controlling the operation of said pump through said mode selection signal generating means when a low pressure is detected in said accumulator to drive the pump until a high pressure is detected in said accumulator.

* * * * *